Aug. 26, 1941.  F. GRAY  2,254,036
PHASE CONTROL
Filed Nov. 18, 1939
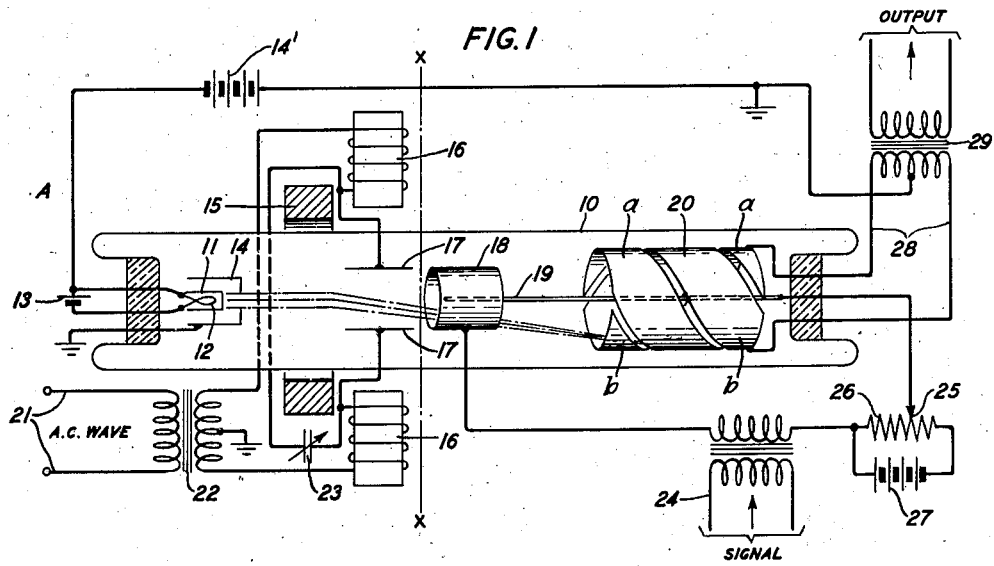
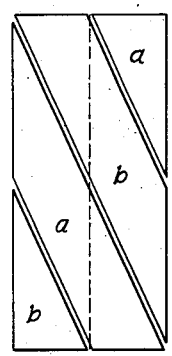
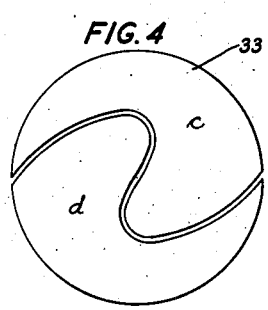
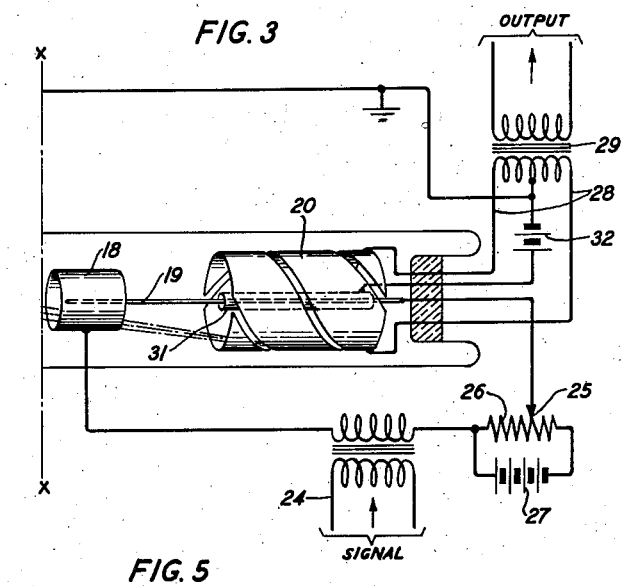
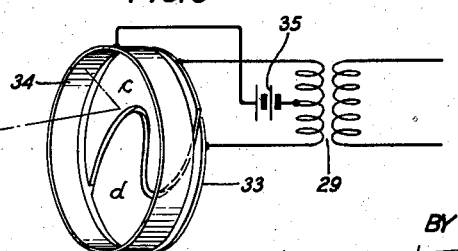
INVENTOR
F. GRAY
BY
N. A. Burgess
ATTORNEY Patented Aug. 26, 1941

2,254,036

UNITED STATES PATENT OFFICE 2,254,036

PHASE CONTROL

Frank Gray, New York, N. Y., assignor to Bell Telephone Laboratories, Incorporated, New York, N. Y., a corporation of New York Application November 18, 1939, Serial No. 305,088

5 Claims. (Cl. 179—171.5)

The present invention relates to the control of the phase of an alternating current wave for measuring, testing, signaling or other purposes.

An object of the invention is to control the phase of an alternating current wave by electronic means.

In the specific embodiment to be disclosed herein, an alternating current input to a cathode beam tube causes an electron beam to move in a circular path over a split electrode which is shaped so that the phase of the output current depends upon the amplitude of the circular motion. The phase of the output current is varied by changing the amplitude of the circular motion.

The nature of the invention and its various objects will be more fully set forth in the detailed description to follow, taken in conjunction with the accompanying drawing.

In the drawing

Fig. 1 is a view, partly in section, of an electron beam tube embodying the invention in one form;

Fig. 2 is a detail view of the cylindrical target of Fig. 1;

Fig. 3 shows a modification to be made in Fig. 1 by substituting the part to the right of the broken line $x$—$x$; and Figs. 4 and 5 show output electrode modifications.

Referring to Fig. 1, the elongated beam tube 10 is provided with a cathode 11 heated by filament 12 from battery 13 or other suitable source, and anode 14 spaced a short distance from the cathode. A ring magnet 15 surrounds the tube and a circular sweeping system is provided comprising magnetic coils 16, 16 and sweep plates 17, 17. The ring magnet is magnetized along its axis. The focus is adjusted by moving the magnet along the tube. The input current whose phase is to be controlled is shown as coming from a circuit 21 of any suitable type and is applied through transformer 22. In a phase modulating system this current would be the carrier or radio frequency wave to be modulated, and it may have any frequency, high or low, depending upon the particular application. Capacity 23 is used to shunt the sweep plates 17, 17 to allow a greater flow of current through coils 16, 16. The coils may be in series with the capacity 23 as shown in the figure, or they may be operated in shunt with the capacity. This circular sweeping system is the same as that disclosed in my copending application Serial No. 282,385, filed July 1, 1939, issued as Patent No. 2,228,266, January 14, 1941. Instead of the magnet 15 an alternative would be to use a known type of electrostatic lens system located inside the tube.

The modulating wave or phase controlling voltage is applied between cylinder 18 and concentric rod 19. This voltage comes from signal input circuit 24 or from slider 25 on resistance 26 connected to battery 27, or from both. In the case of a phase modulating system the modulating input wave may be speech, for example.

The target 20 is in the form of a cylindrical surface divided into two parts along a helical line and is shown developed as a plane surface (unrolled) in Fig. 2. It will be understood that the sections $a$, $a$ are one part and the sections $b$, $b$ are one part. The output circuit 28 is connected across the two parts $a$, $b$. Output transformer 29 leads to any suitable indicating, measuring or transmitting circuit, device or medium. The primary winding of transformer 29 has its midpoint connected to ground and to the positive pole of anode battery 14'. Anode 14 is connected to the same pole and to ground. The negative pole is connected to cathode 11.

In operation, the anode 14 draws electrons from the hot cathode 11, and the cylindrical magnet 15 concentrates them into a beam. The beam passes through the sweep fields of the coils 16, 16 and the sweep plates 17, 17, which give the beam a circular motion. The coils and the sweep plates are operated in series from the alternating current whose phase is to be shifted, and the beam revolves at the frequency of this current. The revolving beam then passes through the cylinder 18, where it is deflected in a radial direction by the instantaneous voltage between the cylinder and the coaxial rod 19. This voltage is supplied from the modulating signal, and the amplitude of the circular motion is thus modulated by the signal. The beam then comes to a focus and impinges on the inside wall of the cylindrical electrode 20, where it travels around the wall in a circular path. The axial location of the beam's circular path on the split electrode varies with the amplitude of the circular motion, and the phase of the output current from the split electrode is thus modulated by the input signal. The dependence of the output phase on the location of the beam's path is seen more clearly from an inspection of Fig. 2. Normally the beam follows the median line shown dotted and vertical in Fig. 2 and it is shifted toward the right or left by input voltages between cylinder 18 and rod 19.

This tube may also be used to convert an amplitude modulated current into a correspondingly phase modulated current. For this purpose the signal input transformer is omitted, and the amplitude modulated current is applied through circuit 21 to the sweep transformer 22. This amounts to an alternative method for phase modulating an alternating current with a signal.

In the modification shown in Fig. 3, the cylinder 20 is coated on its inside surface with a substance to make it a good emitter of secondary electrons and a positive collector electrode 31 surrounding rod 19 and insulated from it serves to collect the secondarily emitted electrons. The circuit connections to elements 18 and 19 are as before. The output circuit connections from the two parts of cylinder 20 are as before but the output transformer is center-tapped and its midpoint is connected to electrode 31. Battery 32 makes electrode 31 positive towards cylinder 20 to attract secondary electrons. The output energy can be made much greater with the Fig. 3 structure because of the use of secondary emission.

An alternative form of target is shown in Fig. 4 as a flat surface divided into two parts $c$, $d$ by a spiral line each half of which has the form, expressed in polar coordinates, $$r = \pm k\theta$$

where $r$ is the radial distance, $\theta$ the angular displacement and $k$ a constant. It will be understood that the beam is focused on the surface and travels in a circular path of varying radius depending upon the magnitude of the control voltage.

In Fig. 5 the electrode 33 is shown provided with a collecting electrode 34 placed in front and biased positively by battery 35. The output connections are as in Fig. 3. The beam is shown as striking electrode $c$ and driving out secondary electrons which are shown attracted over to ring 34. Portions $c$, $d$ are coated to make them good emitters.

While either form of output electrode structure may be used, the cylindrical shape does not require as large diameter of tube and should, in general, give improved characteristics for very small inputs, the path of travel over the electrode surface being as long for small as for large inputs. In either case the modifications which utilize secondary emission are preferable from the standpoint of increased output. The increased output is primarily obtained by drawing the secondary electrons away from the targets and thus eliminating the serious loss in output that would otherwise result from a flow of secondary electrons from one target to the other. The output may be still further increased by making the targets of a material such that the secondary current exceeds the primary current.

The construction may be varied without departing from the invention, the scope of which is defined in the claims.

What is claimed is:

1. A phase controlling system comprising an electron beam tube, means to rotate the beam under control of an alternating current wave whose phase is to be controlled, a target on which said beam impinges, said target comprising a cylindrical surface divided along a helical line into two electrically separated parts whereby said beam traverses both parts in one complete rotation, and means for varying the position, along the cylinder, of the beam path.

2. A system according to claim 1 including an electrode in the space traversed by said beam for altering the position of the beam path over the surface of the cylindrical target.

3. A system according to claim 1 including an electrode within the cylindrical target for collecting secondary electrons emitted from the target, and means to give said electrode a positive potential with respect to said target.

4. In combination, an elongated space discharge tube having a cathode, beam forming means, circular sweep means and a target in the order named, said target comprising a cylindrical surface coaxial with said tube and divided into two electrically separated parts along a helical line, said target being positioned to be swept over by said beam on its inner surface, means to vary the angle of deflection of the beam to cause it to vary its incidence upon the surface of the target lengthwise thereof, and an output circuit connected to the two portions of said target.

5. A combination according to claim 4 in which the last said means comprises an annular electrode in front of said target and coaxial therewith and a rod extending axially through both the target and said electrode, and means for impressing a control voltage between said electrode and rod.

FRANK GRAY.